June 11, 1929.  W. GROSSKOPF  1,717,206
BAND SAW SHARPENER
Filed July 16, 1928  2 Sheets-Sheet 1

WITNESSES
Jos. R. Lamia
Hugh H. Ott

INVENTOR
William Grosskopf
BY
Munn & Co.
ATTORNEY

Fig. 4.

Patented June 11, 1929.

1,717,206

UNITED STATES PATENT OFFICE.

WILLIAM GROSSKOPF, OF NEW YORK, N. Y., ASSIGNOR OF ONE-FOURTH TO WILLIAM N. STEELE, OF NEW YORK, N. Y., ONE-FOURTH TO GEORGE MARTIN, OF EAST ELMHURST, NEW YORK, AND ONE-FOURTH TO WILLIAM TONDL, OF FLUSHING, NEW YORK.

BAND-SAW SHARPENER.

Application filed July 16, 1928. Serial No. 293,256.

This invention relates to saw sharpening devices and has particular reference to devices for sharpening band saws.

The invention primarily comprehends an improved device for sharpening band saws which is applicable to all standard makes of machines and which eliminates the necessity of removing the saw from the machine for the sharpening operation.

In view of the fact that the teeth of band saws vary in their angular relation to the blade, it is essential to compensate for this variation, and in this connection the present invention comprehends means for mounting the grinding and feeding elements of the sharpening device whereby the same may be readily adjusted to coincide with the angularity of the saw teeth.

Band saw teeth also vary as to their spacing and to compensate for this the feeding element of the sharpening device is adjustable within certain limits so that one device may be employed for sharpening saws of different sizes or grades.

As a further feature, the invention aims to provide a simple and effective means for detachably associating the sharpening device with the table of a band saw machine.

Other objects reside in the simplicity of construction and mode of use of the device, the economy with which the same may be produced and the general efficiency derived therefrom.

With the above recited and other objects in view, reference is had to the following specification and accompanying drawings in which there is exhibited one example or embodiment of the invention while the appended claims define the actual scope of the same.

In the drawings—

Figure 4:
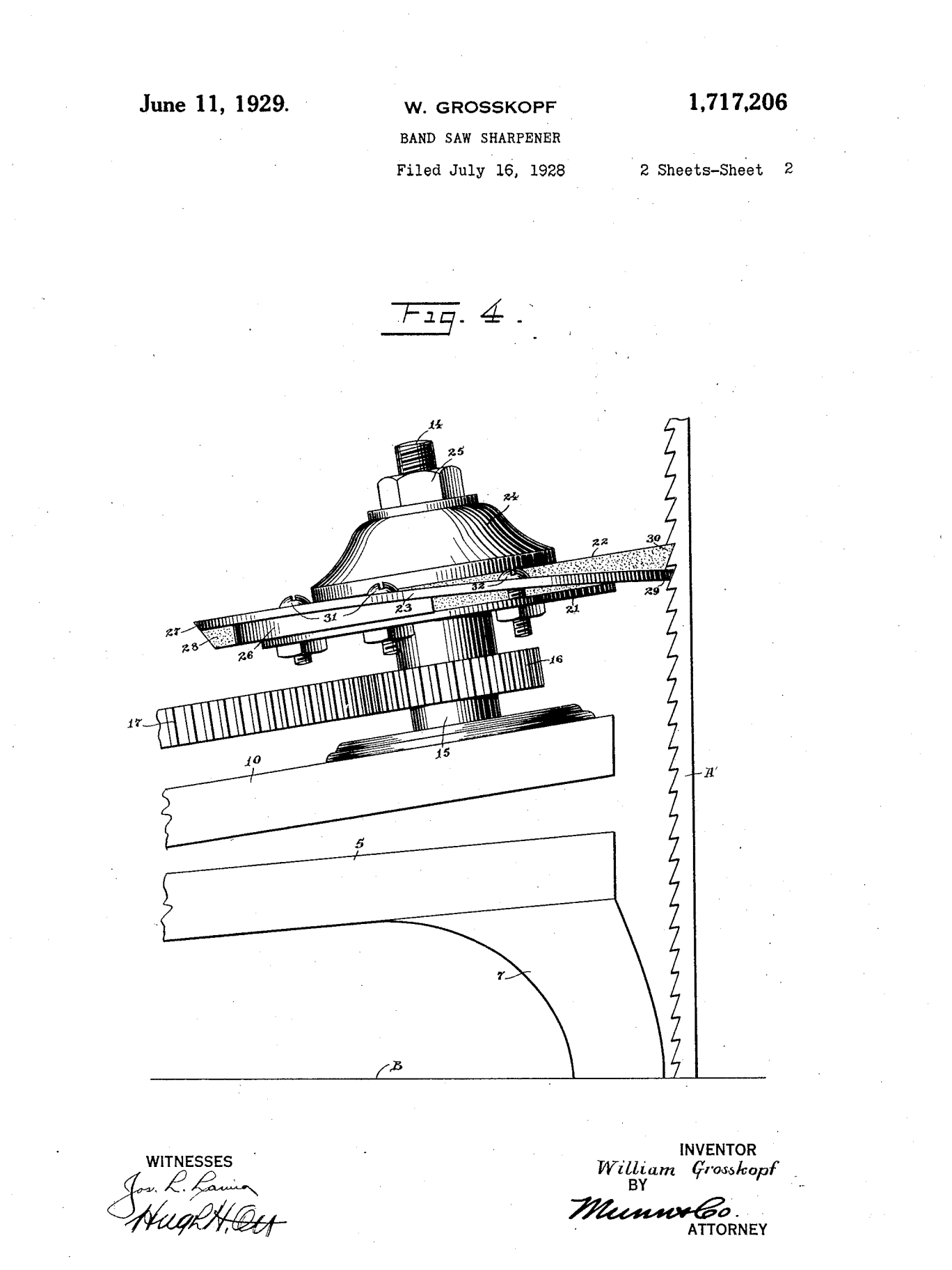

Figure 4 is a fragmentary side view on an enlarged scale.

Figure 1:
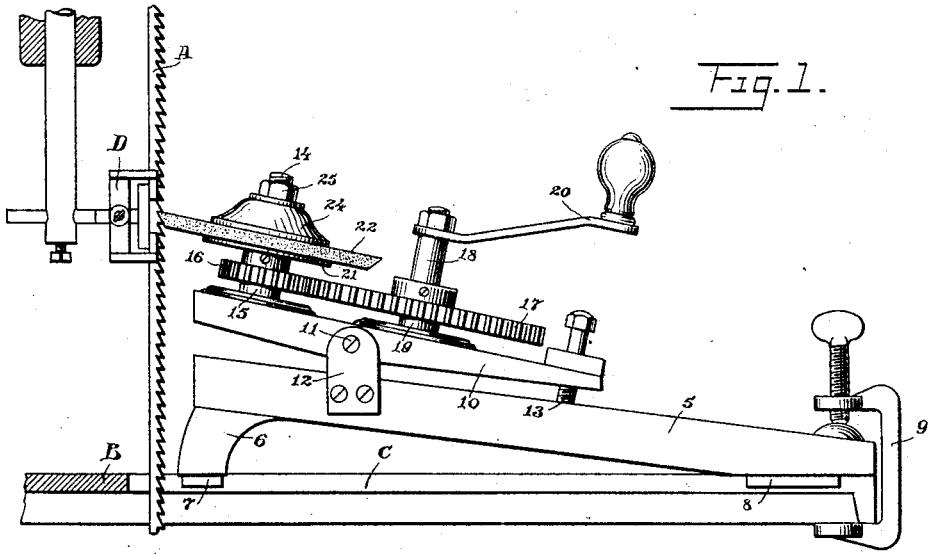
Figure 1 is a side view of the sharpening device in applied relation to the saw.

A designates a band saw blade, B the table which is provided with the usual slot C, and D the saw guide.

The sharpening device constituting the present invention comprises a base 5 which is provided at its forward end with a depending foot 6 having a reduced depending centrally disposed lug 7 which is of a width to snugly engage within the saw slot C. The rear end of the base 5 is provided with a similar depending lug 8 to fit within the saw slot C and obviously this disposes the base 5 at a forwardly and upwardly disposed inclination with respect to the table B. It is obvious also that the lugs 7 and 8 function to prevent lateral movement of the base with respect to the table B, while a suitable clamp 9 is employed for clamping the rear end of the base down onto the table to prevent vertical or longitudinal movement of the device with respect thereto.

A frame or platform 10 is fulcrumed at 11 to laterally spaced bearing ears 12 on the base 5 for rocking movement on a horizontal axis, which movement is effected or controlled by any suitable means such as a set screw 13.

The frame or platform 10 carries at its forward end a substantially vertical shaft 14 which is disposed at a right angle to the platform and which projects upwardly therefrom and is suitably journaled in a bearing 15 for rotation. The shaft has secured thereto a pinion 16 which meshes with a driving gear 17 secured to a shaft 18 journaled in a bearing 19 on the frame or platform 10. The shaft 18 has attached to the upper end a crank handle 20 for the purpose of rotating the driving gear 17 and transmitting motion to the pinion 16 and shaft 14.

The shaft 14 has secured thereto for rotation therewith a disk-like member 21 upon which a segmental sharpening element 22 is arranged and upon which a segmental feeding element 23 is also arranged. The sharpening element 22 is clamped against the member 21 by a clamping head 24 which is impinged against the sharpening element 22 by a nut 25 threadedly engaging the upper end of the shaft 14.

The feeding element has interposed between its under side and the member 21 a wedge-shaped segmental shim 26, which disposes one corner, designated by the reference character 27, in the same plane with the corner 28 of the sharpening element 22. The remaining corner 29 of the feeding element 23 is circumferentially spaced from and disposed in a plane below the remaining corner 30 of the sharpening element 22.

The wedge-shaped shim and the feeding element are fastened to the member 21 by bolts 31, and the shim 26 terminates short of or in spaced relation to the corner 29 of the feeding element. A bolt 32 extends through the free portion of the feeding element 23 and the member 21 and serves as a means for flexing the free portion to regulate the axial adjustment of the corner 29 of the feeding element 23 with respect to the corner 30 of the sharpening element 22 whereby to compensate for variation in the length of the teeth of saws of different sizes.

Figure 2:
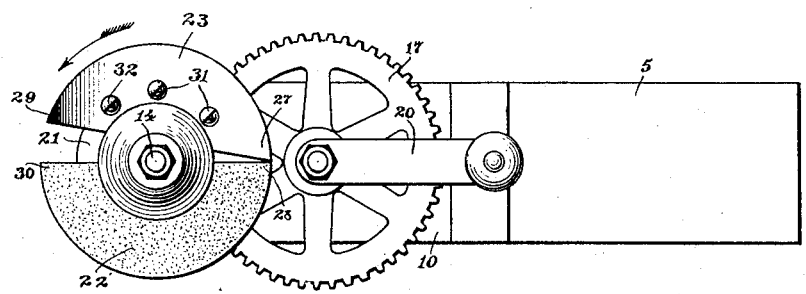
Figure 2 is a plan view of the device.
Figure 3:
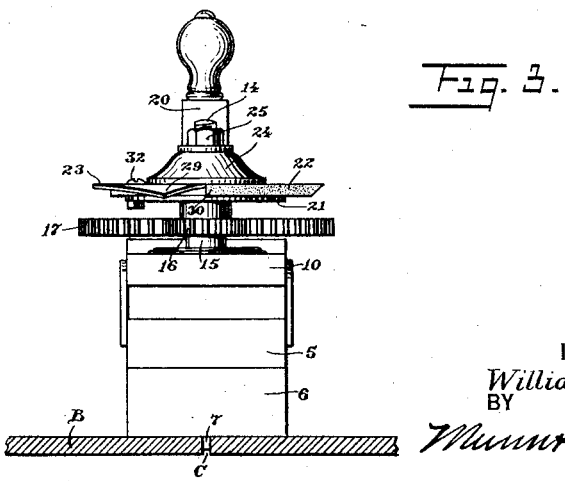
Figure 3 is a front end view thereof.

In use and operation, the device is applied to the table of a band saw machine by resting the rear end of the base 5 on the upper surface of the table B, and the depending foot 6 on the upper surface of the table with the lugs 7 and 8 engaged in the saw slot C. The device is advanced toward the saw A, and the set screw 13 is rotated in the proper direction to rock the frame or platform 10 so that the beveled edge of the sharpening element 22 coincides with the angularity of the teeth of the saw. The bolt 32 of the feeding element is adjusted to cause the corner 29 to be properly spaced from the corner 30 in accordance with the length of the teeth of the saw to be sharpened. After these adjustments are made the clamp 9 is applied and the operator by turning the crank handle 20 imparts rotary motion to the shaft 14 in a clockwise direction thereby causing the member 21 and the segmental sharpening and feeding elements 22 and 23 to be rotated in a counterclockwise direction, as shown by the arrow in Figure 2. It thus follows that the corner 29 of the feeding element engages under a tooth of the saw and cams the same upwardly, guiding the teeth onto the sharpening element 22 at its corner 28. As the upper surface and beveled edge of the sharpening element 22 engages the faces of the teeth the same will be sharpened. After the sharpening element 22 has completely operated on the faces of one tooth the corner 29 will engage with the next adjacent lower tooth and move the same upwardly as the sharpening element 22 is moved into engagement therewith. It will also be observed that the sharpening and feeding elements contact with the saw teeth at the point where the guide D takes up the saw blade From the foregoing it will thus be seen that a sharpening device for band saws has been devised by virtue of which the teeth will be expeditiously and effectually sharpened without removing the saw blade from the machine.

I claim:

1. In a band saw sharpening device, a base adapted for detachable association with the band saw table, a rockable adjustable frame mounted on said base, a rotary member carried by said frame, a segmental sharpening element, and a helical segmental tooth-engaging and feeding element having one of its corners in the same plane with and abutting the corner of the sharpening element, and having its remaining corner axially spaced from the remaining corner of the sharpening element.

2. In a band saw sharpening device, a base adapted for detachable association with the band saw table, a rockable adjustable frame mounted on said base, a rotary member carried by said frame, a segmental sharpening element, a helical segmental tooth-engaging and feeding element having one of its corners in the same plane with and abutting the corner of the sharpening element and having its remaining corner axially spaced from the remaining corner of the sharpening element, and means for effecting the relative adjustment of said spaced corners to compensate for variations in the sizes of the teeth of different saw blades.

3. A sharpening device for band saws, comprising a rotary member, a segmental sharpening element detachably associated therewith, a segmental tooth-engaging and feeding element secured to said member and disposed in a plane at an angle to the sharpening element with one corner abutting the corner of the sharpening element and with the remaining corner axially spaced from the remaining corner of the sharpening element.

4. A sharpening device for band saws, comprising a rotary member, a segmental sharpening element detachably associated therewith, a segmental tooth-engaging and feeding element secured to said member and disposed in a plane at an angle to the sharpening element with one corner abutting the corner of the sharpening element and with the remaining corner axially spaced from the remaining corner of the sharpening element, and means for effecting the relative adjustment of said axially spaced corners to compensate for variation in the size of the teeth of the saw blades to be operated upon.

5. A sharpening device for band saws, comprising a rotary member, a segmental sharpening element detachably associated therewith, a segmental tooth-engaging and feeding element secured to said member and disposed in a plane at an angle to the sharpening element with one corner abutting the corner of the sharpening element and with the remaining corner axially spaced from the remaining corner of the sharpening element, means for effecting the relative adjustments of said axially spaced corners to compensate for variation in the size of the teeth of the saw blades to be operated upon, and means for detachably and adjustably associating the rotary member with the table of the band saw machine whereby the sharpening element coincides with the angularity of the teeth of the saw blade.

Signed at New York city, in the county of New York and State of New York, this 12th day of July, A. D. 1928.

WILLIAM GROSSKOPF.